United States Patent [19]

Ohara et al.

[11] Patent Number: 5,045,235

[45] Date of Patent: Sep. 3, 1991

[54] TRANSPARENT CONDUCTIVE FILM

[75] Inventors: Nobuhiko Ohara; Hirozumi Izawa, both of Shiojiri, Japan

[73] Assignee: Showa Denko K.K., Tokyo, Japan

[21] Appl. No.: 527,969

[22] Filed: May 24, 1990

[30] Foreign Application Priority Data

May 24, 1989 [JP] Japan .................................. 1-130740

[51] Int. Cl.$^5$ .............................................. H01B 1/08
[52] U.S. Cl. ................... 252/501.1; 252/518; 252/520; 428/697; 428/701; 428/702; 428/1; 428/917
[58] Field of Search ............... 428/450, 457, 469, 697, 428/701, 702, 697, 1; 501/134, 152; 252/501.1, 518, 520

[56] References Cited

U.S. PATENT DOCUMENTS 4,070,529 1/1978 Delmas et al. ....................... 501/152
4,399,194 8/1983 Zelez et al.

FOREIGN PATENT DOCUMENTS 59-71205 4/1984 Japan.
59-163707 9/1984 Japan.
61-294703 12/1986 Japan.
63-78404 4/1988 Japan.

Primary Examiner—Ellis P. Robinson
Assistant Examiner—Archene A. Turner
Attorney, Agent, or Firm—Sughrue, Mion, Zinn, Macpeak & Seas

[57] ABSTRACT

A transparent conductive film comprises, as the main component, indium oxide ($In_2O_3$), and 6 to 20 mol % of zirconium oxide ($ZrO_2$). The film has a light transmittance of 90% or more and an electric resistivity of less than the $2 \times 10^{-4}$ Ω. cm of a conventional ITO film.

2 Claims, No Drawings

TRANSPARENT CONDUCTIVE FILM

BACKGROUND OF THE INVENTION

1. Field of the Invention

The present invention relates to a transparent conductive film used for a transparent electrode of a display, such as a liquid crystal display, an electroluminescence display, and an electrochemichromic display, an image sensor, a solar cell or the like.

2. Description of the Related Art

Various transparent conductive films have been produced by forming a thin film of, e.g., metal, such as gold and platinum, or oxide, such as tin oxide, indium oxide and mixture thereof, on a substrate. An indium-tin-oxide (ITO) film, which comprises indium oxide and tin oxide added thereto, is widely used for various devices, particularly, a liquid crystal display, because the ITO has superior properties such as a high transparency, a lower resistivity, a larger etch rate, a better chemical stability, and a stronger adherence to a substrate, among known transparent conductive films.

To lower the resistivity of the transparent conductive film of oxide materials, the oxide materials are made semiconducting materials, due to a control of (1) the valence thereof or (2) a reduction thereof.

The resistivity-lowering technique based on the valence control semiconductorizing system is used in the formation of the ITO film or the following film formations.

According to Japanese Unexamined Patent Publication (Kokai, JP-A-) No. 59-163707, at least one of the oxides of ruthenium oxide, lead oxide, and copper oxide is added to ITO to obtain a transparent conductive film having an excellent resistivity of $0.7 \times 10^{-4}$ Ω-cm (ohm-centimeter) and a superior light transmittance of 88%. According to Japanese Unexamined Patent Publication (Kokai, JP-A-) No. 59-71205, 1.01 to 3 wt % of phosphorous oxide is added to ITO to obtain a transparent conductive film 100 nm thick and having an excellent resistance of 0.3 Ω/□ (resistivity of $3 \times 10^{-4}$ Ω-cm) and a superior light transmittance of 90%. According to Japanese Unexamined Patent Publication (Kokai, JP-A-) No. 61-294703, aluminum fluoride is added to indium oxide to obtain a transparent conductive film 60 nm thick and having an excellent resistance of 220 Ω/□ (resistivity of $13 \times 10^{-4}$ Ω-cm) and a superior light transmittance of 85%. Furthermore, according to Japanese Unexamined Patent Publication (Kokai, JP-A-) No. 63-78404, aluminum fluoride is added to ITO to obtain a transparent conductive film 150 nm thick and having an excellent resistance of 5 Ω/□ (resistivity of $0.75 \times 10^{-4}$ Ω-cm) and a superior light transmittance of 84%.

The resistivity-lowering technique based on the reaction control semiconductorizing system is used in the formation of a transparent conductive film of the Zelez et al. patent (U.S. Pat. No. 4,399,194). According to the Zelez et al. patent, the transparent conductive film comprising 40 to 60 wt % (60.0 to 7.2 mol %) of zirconium oxide and the remainder of indium oxide has a light transmittance of 83% and a resistivity of $4.4 \times 10^{-4}$ Ω-cm, after annealing (see Table II, column 4).

The methods of forming a transparent conductive film include physical vapor deposition (PVD) methods such as vacuum deposition, ion-plating and sputtering, chemical reactive deposition (CVD) methods such as thermal decomposition, and coating layer deposition (CLD) methods such as spraying and dipping. Among these methods, the PVD methods (specially, the sputtering method) are widely used, as a transparent conductive film having a good density and a low resistivity can be easily formed thereby.

Currently, liquid crystal displays are made larger for word processors, television receivers or the like, which require an improvement of the light transmittance of a transparent conductive film without a conventional level of an electric resistance thereof. Furthermore, a thickness of the transparent conductive films is larger than 200 nm, and these films require a relatively long etching time. In this case, an undesirable break of patterned lines formed on the film, and/or a nonuniformity of the resistivity of the film in the display due to a deterioration of the film surface conditions occur, to lower a production yield of the displays. If the electric resistivity of the films can be lowered, the thickness of the films can be reduced, with the result that such a film can be etched with decreasing the above-mentioned disadvantages.

SUMMARY OF THE INVENTION

An object of the present invention is to provide a transparent conductive film having an electrode resistivity of $2.0 \times 10^{-4}$ Ω-cm or less and a light transmittance of at least 90%.

Another object of the present invention is to shorten an etching time for the transparent conductive film and to improve the production yield of devices (e.g., liquid crystal displays) by using thinner films, due to the lower resistivity thereof.

The present inventors paid their attention to that a certain metal oxide is added with a metal element having a valence number different from that of the metal of the metal oxide, to semiconductorize the metal oxide by the valence control. In the case of indium oxide, the oxide is added with a metal having a tetravalence, quintevalence or larger valence to semiconductorize the oxide (lower its resistivity), and the present inventors investigate the addition of the metal element, having ion radius close to that of the trivalent indium, to the indium oxide without increasing a strain on the crystal lattice of the indium oxide. The present invention is based on the above investigation.

According to the present invention, a transparent conductive film comprises, as the main component, indium oxide ($In_2O_3$), and 6 to 20 mol % of zirconium oxide ($ZrO_2$).

Where the addition amount of $ZrO_2$ is less than 6 mol %, an electric resistivity of the transparent conductive film is higher than that of a conventional ITO film, and as the addition amount of $ZrO_2$ is increased, the electric resistivity of the film is lowered and then increased. At the $ZrO_2$ amount of 20 mol %, the resistivity is also higher than that of the conventional ITO film. Therefore, preferably the $ZrO_2$ content is from 8 to 16 mol %.

It is possible to lower the resistivity of a transparent conductive film having a composition by which a higher resistivity is given, outside the defined composition range, by annealing same under a reducing atmosphere, but in this case, the light transmittance is reduced. Namely, it is considered that a carrier concentration in the film is increased to lower the light transmittance. In the Zelez et al. patent, the transparent conductive film comprising $In_2O_3$ and a large amount of $ZrO_2$, compared with $ZrO_2$ content of the present invention, is forcibly reduced by annealing for semiconductorization, and thus the light transmittance thereof is as low as 83%.

According to the present invention, the semiconductorization by valence control is performed with a low additive $ZrO_2$ content, so that a larger lattice strain is not imposed, carrier mobility is increased, and a carrier concentration increase is restrained at a low level, with the result that a transparent conductive film is provided with a high light transmittance.

It is possible to replace a part of $SnO_2$ used (added) in a conventional ITO film with the $ZrO_2$.

As a method of forming the transparent conductive film, the sputtering method or an electron-beam vacuum deposition method is normally used, and one of the other methods such as the ion-plating method, chemical vapor deposition method, coating method or the like is suitably adopted. Suitable raw materials are used depending on the forming method.

The sputtering method and electron-beam vacuum deposition method use a sintered body of oxides of indium and zirconium, or alloy of indium and zirconium, as an evaporating source.

The oxide sintered body is made of raw materials such as oxide, metal, hydroxide, chloride, nitrate, sulfate or the like of In and/or Zr, and the sintered body is produced by mixing the raw materials in a mixer, e.g., a ball mill, calcining the mixture powder at 400° to 1400° C., grinding the calcined product to form a powder, adding binder such as polyvinyl alcohol (PVA) and polyvinyl butyral (PVB) to the powder, granulating the powder to form granules, by a freeze-drying method, a spray-drying method and the like, compacting the granules at 500 to 4,000 kg/cm$^2$ to form a desired shape, and sintering the compact at 1,200° to 1,600° C.

Where the transparent conductive film is formed by electron-beam vacuum deposition, the sintered body is melted and evaporated with an electron-beam irradiation under an oxygen atmosphere at a very low vacuum pressure, and the evaporated material is deposited on a substrate heated to a suitable temperature. The deposition rate depends on the voltage, current, and beam diameter of the electron-beam. The oxygen pressure, the substrate temperature, and the deposition rate are suitably set to form a film having a light transmittance of 90% or more and a minimum or near minimum resistivity. The following conditions are considered suitable for the above purpose:

a first vacuum pressure: $0.5 \times 10^{-5}$ Torr or less
an oxygen pressure: $0.5 \times 10^{-4}$ to $4 \times 10^{-4}$ Torr
a substrate temperature: 200° to 400° C.
a deposition rate: 0.05 to 1.0 nm/sec.

Where the film is formed by the sputtering method, the sintered body (or alloy) of a target is sputtered under a mixed gas of oxygen and argon, to deposit sputtered material (or with oxygen) on a substrate heated to a suitable temperature. The mixed gas consists of oxygen and argon at a molar ratio of 0.5:9.5 to 4:6 and had a vacuum pressure of $1 \times 10^{-3}$ to $5 \times 10^{-2}$ Torr after a first vacuum pressure of $1 \times 10^{-5}$ Torr or less. In the case of the alloy target, the mixed gas should contain a larger amount of oxygen within the molar ratio, to form a strong oxidizing atmosphere. Preferably, the substrate temperature is 200° to 350° C. and the deposition rate is 1.0 nm/sec or less.

If the oxygen partial pressure is lower than that calculated based on the above-mentioned molar ratio, the formed film has a low light transmittance and high resistivity. As the oxygen partial pressure is increased, the light transmittance is increased and the resistivity lowered, but becomes higher than the calculated value of the maximum oxygen content to increase the resistivity. A substrate temperature of less than 200° C. lowers the light transmittance and increases the resistivity. If the deposition rate is more than 1.0 nm/sec, the light transmittance and resistivity of the film are poor. Therefore, taking the above-mentioned matters into consideration, suitable sputtering conditions are selected to form a film having a light transmittance of 90% or more and a lowest or near lowest resistivity.

DESCRIPTION OF THE PREFERRED EMBODIMENTS

The present invention will be made more apparent by the following examples and comparative examples.

EXAMPLES 1 to 3 and COMPARATIVE EXAMPLES 1 to 3

$In_2O_3$ powder and $ZrO_2$ powder were prepared in the ratios shown in Table 1 for Samples 1 to 6 (corresponding to Comparative Examples 1 and 2, Examples 1 to 3, and Comparative Example 3), respectively. These powders and ethanol were put in a ball mill using nylon ball, and were wet-mixed at a slurry concentration of 50%, for 48 hours. The obtained slurry was dried at 60° C., and then calcined at 1,400° C. in air. The calcined product was dry-ground to powder in the ball mill using nylon ball, for 24 hours, and to the ground powder was added 20 wt % of an aqueous solution containing 2.5% polyvinyl alcohol (PVA), which was granulated in a freeze-dryer to form granules having an average particle diameter of 20 μm. The granules were compacted at a pressure of 4 ton/cm$^2$ to form a compact body having a diameter of 16 mm and a thickness of 10 mm. The compact body was covered with indium oxide powder and sintered at 1,450° C. for 15 hours in air, to form a sintered product. The covering indium oxide powder prevented a volatilization of the indium component of the sintered product, and was removed after the sintering.

The sintered product as an evaporating source was set in an electron-beam vapor deposition apparatus, and the apparatus was evacuated to a vacuum pressure of $1 \times 10^{-5}$ to $1.5 \times 10^{-5}$ Torr and then oxygen fed therein to a pressure of $2 \times 10^{-4}$ Torr, and a slide glass substrate having the dimensions of $76 \times 26 \times 1$ mm was heated at 350° C. in the apparatus. The sintered product was then melted with an electron-beam to evaporate and to deposit same on the substrate, with the result that a transparent conductive film was formed (grown) at a rate of 0.1 to 0.13 nm/sec.

The obtained transparent conductive films of Samples 1 to 6 had the thickness, light transmittances, and electric resistivities shown in Table 1, respectively.

The film thickness was determined by measuring a step between the surface of the formed film and the substrate surface exposed by removing a portion of the formed film together with an underlying mask film formed on the portion of the substrate prior to the deposition, with a measuring instrument, e.g., a Talystep produced by Rank Tayl Hobson Ltd.

The light transmittance was measured with a spectroscope produced by Tokai Kogaku Kabushiki Kaisha, with a light having a wavelength of 550 nm.

The resistivity was measured by a four terminal method in which four conductors were soldered to the film, in a straight line.

The chemical compositions of the films were slightly different from those of the sintered products, and the present inventors confirmed by chemical analysis that the difference between the contents of the additive ($ZrO_2$) of the films and the sintered products was within $\pm 0.05$ mol %.

TABLE 1

| Sample No. | Composition (mol %) ((g)) | | Film Thickness (nm) | Light Transmittance (%) | Electric Resistivity ($\times 10^{-4}$ $\Omega \cdot cm$) |
| --- | --- | --- | --- | --- | --- |
| | $In_2O_3$ | $ZrO_2$ | | | |
| 1 (Comp. 1) | 30 (49.13) | 70 (50.87) | 84 | 90 | 15.0 |
| 2 (Comp. 2) | 75 (87.11) | 25 (12.8) | 88 | 90 | 2.3 |
| 3 (Ex. 1) | 80 (90.01) | 20 (9.99) | 90 | 90 | 1.9 |
| 4 (Ex. 2) | 91 (95.80) | 9 (4.20) | 80 | 90 | 1.54 |
| 5 (Ex. 3) | 94 (97.25) | 6 (2.75) | 92 | 90 | 2.0 |
| 6 (Comp. 3) | 97 (98.65) | 3 (1.35) | 84 | 89 | 2.3 |

Note:
g ... weight (gram) of uses powder
Comp. ... Comparative Example
Ex. ... Example according to the present invention As can be seen from Table 1, as the amount added of $ZrO_2$ is increased, the electric resistivity is lowered and then is inversely increased at a content of more than about 9 mol % of $ZrO_2$. In the range of from 6 to 20 mol %, the light transmittance is 90% or more and the resistivity is lower than the $2 \times 10^{-4}$ $\Omega \cdot cm$ of a conventional ITO film.

EXAMPLES 4 to 6 and COMPARATIVE EXAMPLES 4 to 6

$In_2O_3$ powder and $ZrO_2$ powder used in the above-mentioned experiments were prepared in the ratios shown in Table 2, for Samples 7 to 12 (corresponding to Comparatives Examples 4 and 5, Examples 4 to 6, and Comparative Example 6), respectively. From these powders a sintered product was made in a similar manner to that explained in the above-mentioned experiments. Namely, both the powders and ethanol were put in a ball mill and wet-mixed at a slurry concentration of 50%, for 48 hours. The obtained slurry was dried at 60° C., and then calcined at 1,400° C. in air. The calcined product was dry-ground in the ball mill for 24 hours to form a powder, to the ground powder was added 20 wt % of an aqueous solution containing 2.5% polyvinyl alcohol (PVA), and then the mixture was granulated in a freeze-dryer to form granules having an average particle diameter of 20 μm. The granules were compacted at a pressure of 4 ton/cm², to form a compact body (plate) having a diameter of 80 mm and a thickness of 3 mm. The compact body was covered with indium oxide ($In_2O_3$) powder and sintered at 1,450° C. for 15 hours in air, to form a sintered product (target).

The target (plate) was set in a RF magnetron sputtering apparatus, and the apparatus was evacuated to a vacuum pressure of $1 \times 10^{-5}$ Torr and then fed with a mixed gas of oxygen and argon (having a molar ratio of 0.5 to 9.5) to a pressure of $1 \times 10^{-3}$ Torr. The slide glass substrate having the dimensions of $76 \times 26 \times 1$ mm was heated at 350° C. in the apparatus. Under the above-mentioned conditions the target was sputtered by applying an electric power to deposit sputtered materials on the substrate, with the result that a transparent conductive film was formed (grown) at a rate of 0.3 to 0.5 nm/sec.

The thickness, light transmittances, and resistivities of the obtained transparent conductive films of Samples 7 to 12 were measured in the above-mentioned manner, to obtain the results shown in Table 2. The chemical compositions of the films were slightly different from those of the target, but the difference between the added contents of $ZrO_2$ of the films and the target was formed by chemical analysis to be within $\pm 0.05$ mol %.

TABLE 2

| Sample No. | Composition (mol %) | | Film Thickness (nm) | Light Transmittance (%) | Electric Resistivity ($\times 10^{-4}$ $\Omega \cdot cm$) |
| --- | --- | --- | --- | --- | --- |
| | $In_2O_3$ | $ZrO_2$ | | | |
| 7 (Comp. 4) | 30 | 70 | 98 | 91 | 58.0 |
| 8 (Comp. 5) | 75 | 25 | 100 | 90 | 2.1 |
| 9 (Ex. 4) | 80 | 20 | 101 | 90 | 1.8 |
| 10 (Ex. 5) | 91 | 9 | 99 | 91 | 1.7 |
| 11 (Ex. 6) | 94 | 6 | 98 | 90 | 1.8 |
| 12 (Comp. 6) | 97 | 3 | 102 | 90 | 2.2 |

Note:
Comp. ... Comparative Example
Ex. ... Example according to the present invention As can be seen from Table 2, as the added of $ZrO_2$ content is increased, the electric resistivity is lowered, and then inversely, increased from a content of more than about 9 mol % of $ZrO_2$. In the range of from 6 to 20 mol %, the films have a light transmittance of 90% or more and a resistivity lower than the $2 \times 10^{-4}$ $\Omega \cdot cm$ of the conventional ITO film.

As mentioned above, the transparent conductive film according to the present invention has superior properties compared to those of a conventional ITO transparent conductive film. Therefore, it is possible to reduce the film thickness on the basis of the lower resistivity, which contributes to an improvement of the selective etching (patterning) process of the film and an increase of a yield of products using the film.

It will be obvious that the present invention is not restricted to the above-mentioned embodiments and that many variations are possible for persons skilled in the art without departing from the scope of the invention. For example, it is possible to use a semiconductor (e.g., silicon) or resin substrate instead of a glass substrate, and the former substrate may be a sheet or film.

We claim:

1. A transparent conductive film having an electrode resistivity of $2.0 \times 10^{-4}$ $\Omega$-cm or less and a light transmittance of at least 90%, said transparent conductive film comprising, as the main component, indium oxide, and 6 to 20 mol % of zirconium oxide.

2. A transparent conductive film according to claim 1, wherein said zirconium oxide content is from 8 to 16 mol %.

* * * * *